US009273966B2

(12) United States Patent
Bartels

(10) Patent No.: US 9,273,966 B2
(45) Date of Patent: Mar. 1, 2016

(54) TECHNIQUE FOR CALIBRATING DEAD RECKONING POSITIONING DATA

(75) Inventor: Florian Bartels, Nuremberg (DE)

(73) Assignee: ELEKTROBIT AUTOMOTIVE GmbH, Erlangen (DE)

(*) Notice: Subject to any disclaimer, the term of this patent is extended or adjusted under 35 U.S.C. 154(b) by 0 days.

(21) Appl. No.: 13/516,585

(22) PCT Filed: Nov. 8, 2010

(86) PCT No.: PCT/EP2010/006790
§ 371 (c)(1),
(2), (4) Date: Aug. 21, 2012

(87) PCT Pub. No.: WO2012/062339
PCT Pub. Date: May 18, 2012

(65) Prior Publication Data
US 2013/0297204 A1 Nov. 7, 2013

(51) Int. Cl.
G01C 21/12 (2006.01)
G01C 21/16 (2006.01)
G01C 25/00 (2006.01)

(52) U.S. Cl.
CPC .............. *G01C 21/12* (2013.01); *G01C 21/165* (2013.01); *G01C 25/005* (2013.01)

(58) Field of Classification Search
CPC ..... G01C 21/12; G01C 21/165; G01C 25/005
USPC ............... 701/33.1, 445, 469–481, 495, 498; 702/85, 92–97, 104–107, 141–142, 702/148–151, 158, 165
See application file for complete search history.

(56) References Cited

U.S. PATENT DOCUMENTS

| 5,416,712 | A  | * | 5/1995 | Geier et al. ................ 701/472 |
| 5,440,484 | A  | * | 8/1995 | Kao ............................ 701/530 |
| 6,014,610 | A  | * | 1/2000 | Judge et al. .................. 702/92 |
| 2007/0010936 | A1 | * | 1/2007 | Nordmark et al. ........... 701/200 |
| 2009/0043504 | A1 |   | 2/2009 | Bandyopadhyay et al. |
| 2010/0039318 | A1 |   | 2/2010 | Kmiecik et al. |

FOREIGN PATENT DOCUMENTS

JP 2-212714 A 8/1990

OTHER PUBLICATIONS

Vicek, C., McLain, P., & Murphy, M. (Oct. 1993). GPS/dead reckoning for vehicle tracking in the "urban canyon" environment. In Vehicle Navigation and Information Systems Conference, 1993., Proceedings of the IEEE-Iee (pp. 461-461A). IEEE.*

(Continued)

*Primary Examiner* — John Q Nguyen
*Assistant Examiner* — Alan D Hutchinson
(74) *Attorney, Agent, or Firm* — Westerman, Hattori, Daniels & Adrian, LLP

(57) ABSTRACT

A technique for calibrating sensor data used for dead reckoning positioning comprises the steps of simultaneously recording sensor data of at least one dead reckoning positioning sensor and position data of a position sensor during travel, comparing a first travel path derived from the position data with a second travel path derived from the sensor data, and calibrating the sensor data based on the comparison.

24 Claims, 3 Drawing Sheets

(56) References Cited

OTHER PUBLICATIONS

Kim, J., Lee, J. G., Jee, G. I., & Sung, T. K. (Apr. 1996). Compensation of gyroscope errors and GPS/DR integration. In Position Location and Navigation Symposium, 1996., IEEE 1996 (pp. 464-470). IEEE.*

Taylor, G., Brunsdon, C., Li, J., Olden, A., Steup, D., & Winter, M. (2006). GPS accuracy estimation using map matching techniques: Applied to vehicle positioning and odometer calibration. Computers, environment and urban systems, 30(6), 757-772.*

International Search Report of PCT/EP2010/006790, mailing date Nov. 17, 2011.

Written Opinion of PCT/EP2010/006790, mailing date Nov. 17, 2011.

* cited by examiner

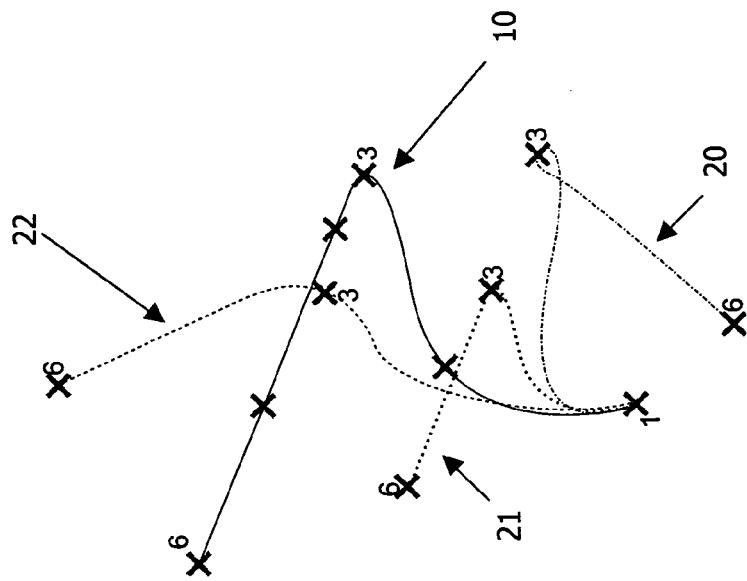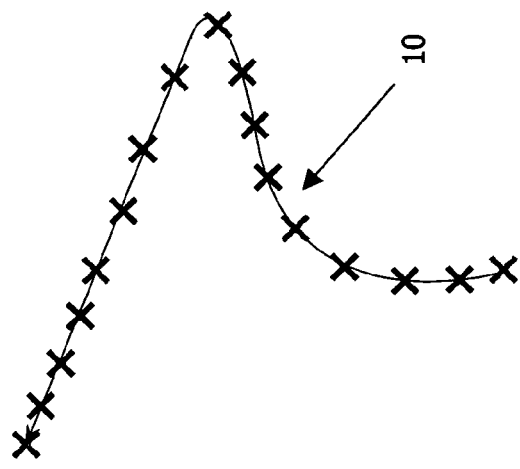
Fig. 3
Fig. 3b
Fig. 3a

TECHNIQUE FOR CALIBRATING DEAD RECKONING POSITIONING DATA

TECHNICAL FIELD

The present disclosure generally relates to dead reckoning positioning. In particular, the disclosure relates to calibration of sensor data used for dead reckoning positioning systems (e.g., in navigation systems, ADAS (Advanced Driver Assistance Systems) or tachographs).

BACKGROUND

Dead reckoning is the process of updating a known absolute position during travel by using relative movement information like speed and angular velocity of a motor vehicle, robot, aircraft, ship, etc. Such relative movement information is typically provided by relative sensors like odometers, airspeed indicators, logs and gyroscopes. Odometer data, airspeed indicator data and log data are indicative of a covered distance d, while gyroscope data are indicative of a change of direction $\Delta\phi$ and, therefore, the course during travel. Once an absolute position and heading of a vehicle is known (i.e., the geographic coordinates and heading of the position), its subsequent positions can be determined from these relative sensor data.

Modern positioning systems utilize an absolute position sensor such as a Global Positioning System (GPS) sensor to determine the current position during travel. The GPS sensor receives radio signals from different GPS satellites, and on basis of the measured signal runtimes the absolute position is determined. The determination of the vehicle position using the GPS sensor fails when not enough satellite signals are received (e.g., due to signal fading in tunnels or urban canyons). Moreover, the quality of the GPS signal can change very quickly, which is observable as position jumping around the real position.

In order to overcome such problems associated with absolute position sensors, modern positioning systems additionally utilize relative movement information from relative sensors for performing dead reckoning positioning during travel. In this context, the main task is an accurate calibration of the relative sensor data since the quality of the measured sensor data depends on the sensors used and external parameters, such as the ambient temperature. Moreover, the measured sensor data as such do not directly indicate the covered distance d and change of direction $\Delta\phi$ during travel. Accordingly, a transformation of the measured sensor data is required in order to perform dead reckoning positioning. This transformation is called "calibration" hereinafter, and the process of determining the current calibration parameters is called "learning".

Common learning algorithms determine the calibration of odometer data and gyroscope data in separate steps and under well defined conditions. For example, in order to obtain a good odometer calibration, the movement of the vehicle during calibration should be as straight as possible. Deviations from a straight movement (e.g., by unintentionally driving a wiggly line) introduce an error in the calibration which is difficult to estimate and, therefore, difficult to compensate electronically. Further, the calibration of a gyroscope sensor requires a precise measurement of a course change of the vehicle. When using a GPS sensor for determining the course change, a gyroscope calibration with small errors can only be obtained when driving a straight line with high enough speed two times and performing a well defined turn in between.

Hence, the commonly used learning processes require some effort and time in order to obtain good calibration results. In addition, calibration errors are difficult to estimate and compensate when using the above described learning process. However, a good calibration with small calibration errors is crucial, since calibration errors are summed up during dead reckoning positioning, leading therefore to large deviations of the calculated absolute positions from the real positions.

SUMMARY

It is an object to simplify and improve the process of calibrating sensor data used for dead reckoning positioning systems (e.g., in navigation systems, ADAS (Advanced Driver Assistance Systems) or tachographs). It is a further object to estimate the accuracy of the learning process.

According to a first aspect, a method for calibrating sensor data used for dead reckoning positioning systems is provided, wherein the method comprises the steps of simultaneously recording sensor data of at least one dead reckoning positioning sensor and position data of a position sensor during travel, comparing a first travel path derived from the position data with a second travel path derived from the sensor data, and calibrating the sensor data based on the comparison.

The comparing step may comprise comparing the shape of the first travel path with the shape of the second travel path. The shape of the first travel path may be defined by absolute position data recorded consecutively during travel. The shape of the second travel path may be derived from calculating a position movement using the consecutively recorded sensor data of the at least one dead reckoning positioning sensor. The shape of the first and second travel path can be compared by determining a deviation parameter indicative of a shape deviation between the first and second travel path. The shape deviation may be determined in various ways, for example by calculating a distance between appropriate points of both paths that correspond to position data and sensor data recorded at approximately the same time. Alternatively, or additionally, the shape deviation may be calculated from a comparison of a heading and/or travelled distance at the corresponding points of both paths. Thus, the deviation parameter quantifies the deviations in the shapes of both paths.

Based on the comparison, the calibration is determined by minimizing the determined deviation parameter indicative of the deviation between corresponding positions of the first and second travel path. For example, the shape of the second travel path derived from the sensor data of the at least one dead reckoning positioning sensor may be adjusted, or matched, to the first travel path. Since the first travel path is indicative of both, the travelled distance d on the one hand and the course on the other hand, all calibration parameters for the sensor data can be determined at the same time when adjusting the second travel path to the first one. In addition to the determination of the calibration, an accuracy of the calibration can be estimated from the path adjustment.

The calibrating step may comprise iteratively refining the calibration of the sensor data until the second travel path (approximately) fits the first travel path. As starting point of a learning process, a second travel path with an arbitrary shape may be calculated on basis of the recorded sensor data and predetermined or arbitrarily chosen calibration parameters. Thereafter, the second travel path so determined may be subjected to a comparison with the corresponding first travel path. Based on a comparison result, candidates for the calibration parameters may be calculated and, based thereon, the second path can be re-calculated. The new shape of the second travel path so obtained (that mainly depends on the calibration of the sensor data) may be compared again with the first travel path. In this way, by repeating the comparing and calibrating steps, the calibration on the one hand as well as the accuracy of the calibration on the other hand can be determined.

Alternatively or in addition to minimizing the deviation parameter, a sequential Monte Carlo method such as particle filters may be used in order to determine the calibration. For this purpose, some random noise is added to previously used candidates that are evaluated and weighted. After evaluation, bad candidates are deleted and the good ones are duplicated with some noise. In the subsequent evaluation, the new candidates are evaluated and weighted again.

For each path, at least three corresponding positions may be used in order to calculate the calibration of the sensor data. In principle, three consecutive positions or three positions selected out from a set of positions that define a shape of a travel path different from a straight line are sufficient in order to determine the calibration of the dead reckoning positioning data. The accuracy of the calibration may be increased when considering an appropriate number of positions while comparing both travel paths.

The sensor data may comprise at least one of odometer data and gyroscope data. The odometer data are indicative of a covered distance d during travel, and the gyroscope data are indicative of an angular velocity $\omega$. Alternatively to odometer data, airspeed indicator data or log data may be used for dead reckoning positioning.

The odometer data may correspond to a number of pulses N output by an odometer. As an example, the number of pulses N may report the number of rotations of an axel of a vehicle and may be proportional to a distance d covered by the vehicle within a certain time interval or between two consecutive measuring events. Hence, the output number of pulses N can be transformed into a distance d by using a calibration value f. The calibration value f may be calculated from a ratio between a predetermined distance D and the number of pulses $N_D$ output by the odometer while travelling the predetermined distance D. Such a predetermined distance D may be derived during travel from two consecutive positions measured by an absolute position sensor. By counting the number of pulses while covering the predetermined distance D, the odometer data can be at least roughly pre-calibrated.

Alternatively, during travel the calibration value f may be roughly estimated from a measured pulse rate (i.e., a number of pulses N per time unit) and a current travel velocity derived from the position sensor (e.g., a GPS sensor). The calibration value f can then be calculated from a ratio between the current travel velocity and the measured pulse rate.

The gyroscope data may correspond to a voltage signal V output by a gyroscope. The gyroscope data can be calibrated by a scaling value g and an offset value $V_{bias}$. The offset value $V_{bias}$ may correspond to the voltage signal V of the gyroscope in the absence of a change of direction $\Delta\phi$. Consequently, the offset value $V_{bias}$ can be derived from a standing still event or from a straight travelling event.

The voltage signal V corrected by the offset value $V_{bias}$ may be proportional to the angular velocity $\omega$ of a turn and, therefore, to the change of direction $\Delta\phi$ within a predetermined time interval or between two consecutive measuring events. Thus, the corrected voltage signal $V-V_{bias}$ can be transformed into a change of direction value $\Delta\phi$ by using a scaling value g and by multiplying the result with the predetermined time interval. The scaling value g may be calculated from a ratio between a predetermined change of direction $\Delta\Phi$ within a predetermined time interval and the corresponding output voltage $V_{\Delta\Phi}$ corrected by the offset value $V_{bias}$. For pre-calibration purposes, such a predetermined change of direction $\Delta\Phi$ may be roughly derived from at least three consecutive positions measured by the position sensor.

During travel, the current calibration for the dead reckoning positioning sensor data may be continuously updated or updated at given points in time since the sensor data may be sensitive to external factors that change continuously. Such external factors may be the ambient temperature, the pressure, the tyre wear, etc. Calibration parameters f, g, $V_{bias}$ of former calibrations may be stored and used for pre-calibration during the learning process. Alternatively, arbitrary or predetermined calibration parameters f, g, $V_{bias}$ may be used for pre-calibrating current sensor data.

According to a second aspect, a computer program product comprising program code portions is provided for performing the steps of the method described herein when the computer program product is executed on a computing device. Such a computing device may be part of a positioning system, such as a navigation system, an Advanced Driver Assistance System (ADAS), a tachograph, and so on. The computer program product may be stored on a computer-readable recording medium. For example, the computer program product may be stored on a data carrier such as a hard-disc, a CD, a DVD, or a semi-conductor memory, e.g., a RAM, ROM, EP-ROM, EEP-ROM, etc.

According to a third aspect, the object is solved by a device for calibrating sensor data used for dead reckoning positioning systems, wherein the device comprises a storage unit adapted to record simultaneously sensor data of at least one dead reckoning positioning sensor and position data of a position sensor during travel, a comparing unit adapted to compare a first travel path derived from the position data with a second travel path derived from the sensor data, and a calibration unit adapted to calibrate the sensor data on basis of the comparison.

The device may further comprise of at least one dead reckoning positioning sensor in the form of an odometer adapted to determine a covered distance d of a vehicle and/or a gyroscope adapted to determine a change of direction $\Delta\phi$ during travel.

Alternatively, the covered distance can also be determined by other sensors like acceleration sensors, and the heading can be determined using a compass or the diagonal acceleration while turning.

If the "wheel ticks", i.e. odometers, are available of the right and left hand wheel, also the heading change can be calculated using the "differential wheel speed" technique (the outer wheel has to cover more distance then the inner one while turning). The technique presented herein is not limited to gyro and odometer systems, but can also be used in other configurations.

According to a still further aspect, a navigation device is provided comprising the above-described device for calibrating sensor data used for dead reckoning positioning and a position sensor for determining the absolute position of a vehicle.

BRIEF DESCRIPTION OF THE DRAWINGS

Further features and advantages of the technique presented herein will be now described in connection with an embodiment and the accompanying drawings, in which:

FIG. 3 schematically illustrates a first travel path represented by absolute position data (FIG. 3a) and an adjustment of a second travel path to the first travel path (FIG. 3b) according to the method of FIG. 2.

DETAILED DESCRIPTION

Figure 1:
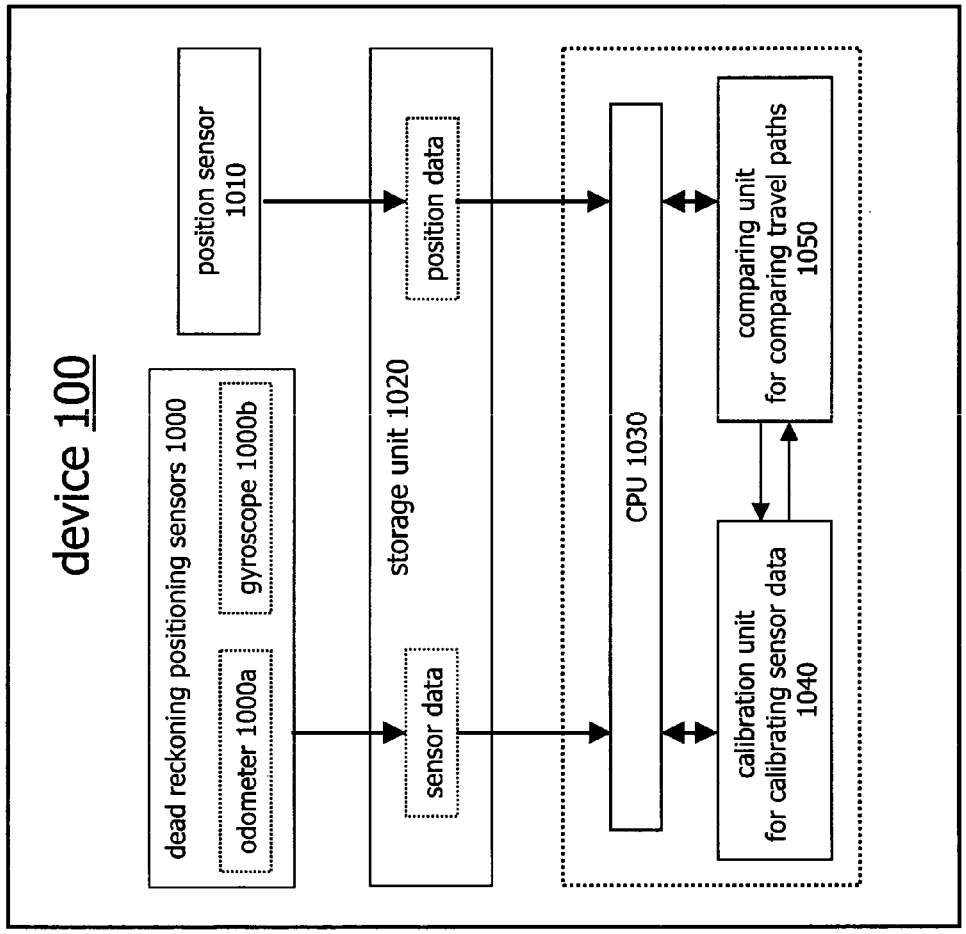
FIG. 1 schematically shows a device embodiment.

FIG. 1 shows an embodiment of a device 100 for calibrating sensor data used for dead reckoning positioning. For instance, the device 100 may be part of a built-in vehicle navigation system (of, e.g., a car or plane) or a Portable Navigation Device (PND), a tachograph or any Advanced Driver Assistance System (ADAS).

The device 100 comprises dead reckoning positioning sensors 1000, a position sensor 1010 (e.g., a GPS sensor), a storage unit 1020, a Central Processing Unit (CPU) 1030, a calibration unit 1040 and a comparing unit 1050. The calibration unit 1040 and the comparing unit 1050 may be designed as separate modules being in communication with the CPU 1030 of the device 100. Alternatively, the CPU 1030, the calibration unit 1040 and/or the comparing unit 1050 may be designed as an integrated unit as illustrated by the dotted box in FIG. 1.

The dead reckoning positioning sensors 1000 comprise an odometer 1000a for sensing a covered distance d and a gyroscope 1000b for sensing an angular velocity ω of a vehicle during travel. The odometer 1000a is configured to provide a number of pulse signals N, which number N is proportional to the current distance d covered by the vehicle during a predetermined time interval or between two consecutive measuring events. For instance, the odometer of a motor vehicle counts the number of wheel revolutions which is a measure for the distance d covered by the vehicle.

The gyroscope 1000b is configured to output a voltage signal V which is proportional to the current angular velocity ω and, therefore, to a change of direction Δφ of the vehicle within a predetermined time interval. The gyroscope 1000b may be designed as mechanical gyroscope, as piezoelectric vibrating gyroscope or optical gyroscope.

Since modern motor vehicles are equipped with an Electronic Stability Control (ESC) system for the wheel brakes and since odometer 1000a and gyroscope 1000b are often an integral part of the ESC system, these already existing sensors can be re-used for dead reckoning positioning. Hence, in an alternative embodiment the device 100 receives odometer and gyroscope signals from the ESC system via a vehicle bus such as the Controller Area Network (CAN) bus. In this case, the dead reckoning positioning sensors 1000 of device 100 are absent.

While the above mentioned dead reckoning positioning sensors 1000 are relative sensors measuring relative quantities, such as distances d and angular velocities ω of the moving vehicle, the position sensor 1010 is configured as absolute position sensor providing absolute coordinate positions of the vehicle during travel on basis of the signal runtimes of radio signals received from at least three satellites.

The storage unit 1020 is in communication with the dead reckoning positioning sensors 1000, the position sensor 1010 and the CPU 1030. The storage unit 1020 is configured to record simultaneously sensor data received from the dead reckoning positioning sensors 1000 and position data received from the position sensor 1010. It is further configured to provide the recorded data to the CPU 1030, the calibration unit 1040 and/or the comparing unit 1050 for further processing. Within the storage unit 1020, position data and sensor data are stored and organized in corresponding databases as illustrated by the dotted boxes in FIG. 1.

The storage unit 1020 may be configured as buffer for the incoming sensor data (i.e., sensor data are only stored as long as they are used for dead reckoning positioning and/or calibration calculation). In a further embodiment, the storage unit 1020 buffers calibration parameters f, g, $V_{bias}$ used in previous calibrations which may be re-used as pre-calibration during a learning process.

The calibration unit 1040 is adapted to "learn" the calibration for current dead reckoning positioning sensor data. It calculates the calibration parameters f, g, $V_{bias}$ on basis of comparison results of the comparing unit 1050. Using the calculated calibration parameters the calibration unit 1040 further calibrates the odometer and gyroscope data, i.e., it transforms the odometer data N and gyroscope data V into distances d and angular velocities ω, respectively.

The comparing unit 1050 is in communication with the calibration unit 1040, from which it receives the calibrated or pre-calibrated distance values d and change of direction values Δφ. At the same time, the comparing unit 1040 receives absolute position data from the position sensor 1010 via the storage unit 1020. The comparing unit 1050 generates a first travel path based on the absolute position data and a second travel path based on the calibrated or pre-calibrated sensor data. It further compares the shape of both travel paths and reports the evaluated comparing results back to the calibration unit 1040.

Figure 2:
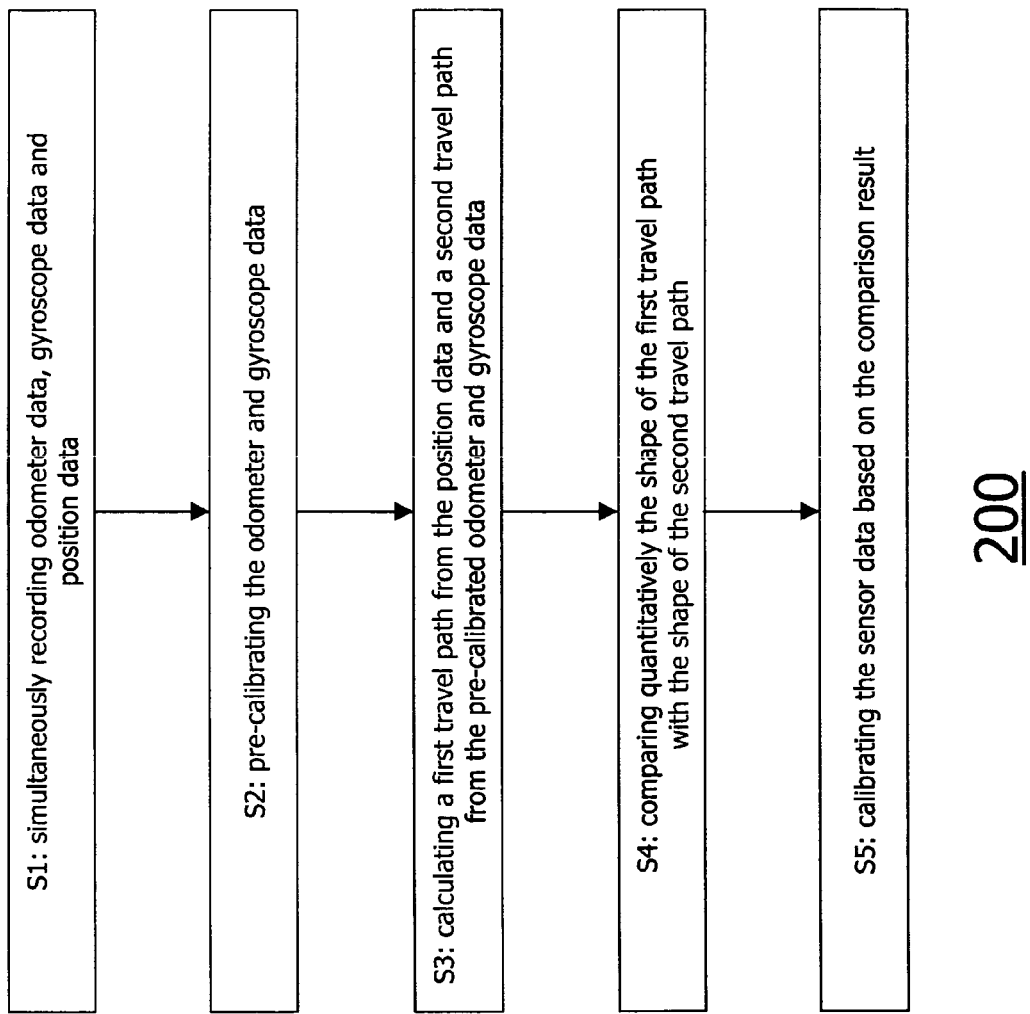
FIG. 2 schematically shows a sequence diagram of a method embodiment for calibrating sensor data used for dead reckoning positioning.

The operation of the calibration device 100 in connection with calibrating recorded sensor data used for dead reckoning positioning will now be discussed in more detail with reference to FIGS. 2 and 3. FIG. 2 shows a sequence diagram 200 illustrating the steps of an exemplary method embodiment. In FIG. 3a, a first travel path 20 (or a part thereof) derived from a set of recorded absolute position data (crosses) is shown. In FIG. 3b, the first travel path 10 (solid line) is compared with a second travel paths 20, 21, 22 (or parts thereof) derived from corresponding dead reckoning sensor data with different calibrations (dotted lines).

In a first step S1, the device 100 records the position data of the position sensor 1010 as well as the odometer data and gyroscope data of the dead reckoning positioning sensors 1000 at approximately the same points in time during travel (and optionally, during an ongoing navigation process). During travel, position data and sensor data are recorded continuously. Hereby, the rate of data recording, i.e., the number of recorded data per time interval, may be predetermined by a driver. Alternatively, the rate of data recording may be dynamically adjusted to the current driving conditions by the device 100, i.e., when the vehicle is moving fast the rate of data recording increases, and when the vehicle is moving slowly the rate is decreased. It may also be envisaged that the data recording is triggered by a predetermined minimal distance the vehicle has to cover between two consecutive measuring events (e.g., 100 m). The measured odometer and gyroscope data reflect the covered distance d and change of direction Δφ of the moving vehicle between two adjacent measured position points. In order to compare the travel path 10 derived from the position data with the travel path 20, 21, 22 derived from the sensor data, the data recording of the sensor data must correlate with the data recording of the position data.

In a second step S2, the CPU 1030 retrieves a set of sensor data from the storage unit 1020 and transmits the data to the calibration unit 1040. Thereafter, the calibration unit 1040 pre-calibrates the retrieved sensor data. The pre-calibration serves only as starting point for learning the current calibration of the retrieved sensor data. In detail, the calibration unit 1040 transforms the current odometer data, i.e. the measured number of pulses N, into distance values d and the current gyroscope data, i.e. the measured gyroscope voltage V, into angular velocity values ω.

The transformation of the odometer pulse number N follows the relation $$d = N \cdot f,$$

wherein f is a calibration value being determined. The calibration value f is the ratio between a predetermined distance D and the number of pulses $N_D$ measured by the odometer 1000a while travelling the predetermined distance D.

Further, the transformation of the gyroscope voltage V follows the relation $$\omega = g \cdot (V - V_{bias}),$$

wherein $V_{bias}$ is an offset value and g is a scaling value being determined. The offset value $V_{bias}$ is indicative of the gyroscope voltage V measured in the absence of a change of direction Δϕ, i.e., when the vehicle is moving along a straight line or standing still. The scaling value g is defined as ratio between a predetermined angular velocity ω of a vehicle turn and the corresponding measured voltage $V_\omega$ corrected by the offset value $V_{bias}$.

Usually the gyroscope voltage is determined (measured) at a fixed rate, like every 100 ms. It is assumed that the angular velocity is constant over the interval Δt between measurements. The heading change Δϕ can be calculated by multiplying the angular velocity ω with the time between measurements:

$$\Delta\phi = \omega * \Delta t$$

To reduce the amount of memory necessary to store gyroscope sensor data, it could be sufficient to store only the sum of successive measurements. This is only allowed when $V_{bias}$, g and the measurement interval can be considered as constant of the examined time.

For pre-calibrating the retrieved sensor data, arbitrary calibration parameters f, g, $V_{bias}$ may be used since the accurate parameters f, g, $V_{bias}$ might still be unknown. Alternatively, calibration parameters f, g, $V_{bias}$ of former calibrations can be retrieved from the storage unit 1020 in order to pre-calibrate the current sensor data. The advantage of using former calibration parameters f, g, $V_{bias}$ is that they may not substantially differ from the expected current calibration parameters f, g, $V_{bias}$, saving therefore computational resources during the learning process.

In a subsequent third step S3, the pre-calibrated set of sensor data is transmitted to the comparing unit 1050. Simultaneously, a corresponding set of position data of the position sensor 1010 is transmitted to the comparing unit 1050. On basis of the position data the comparing unit 1050 calculates the first travel path 10 as shown in FIG. 3a, wherein each cross represents an absolute position measured by the position sensor 1010. In addition, based on the pre-calibrated sensor data the comparing unit 1050 calculates multiple second travel paths 20, 21, 22. Such calculated second travel paths 20, 21, 22 based on differently calibrated sensor data are shown as dotted lines in FIG. 3b. In this context it should be noted that the set of pre-calibrated sensor data can be regarded as a set of translational vectors, wherein the length of the vector represents the covered distance d derived from the odometer data and the orientation of the vector represents the change of direction Δϕ derived from the gyroscope data. Thus, the absolute positions of the second travel path 20, 21, 22 (crosses in FIG. 3b) are calculated by consecutively shifting an initial position (for instance, the initial position measured by the position sensor 1010) using these translational vectors. The second travel paths 20, 21, 22 derived in such a way may substantially differ in shape from the first travel path 10 as shown in FIG. 3b (the solid line corresponds to the first travel path 10 and the dotted lines to the second travel path 20, 21, 22 derived from differently calibrated sensor data).

In the following fourth step S4, the comparing unit 1050 compares the shape of the first travel path 10 with the shape of the second one. For comparison purposes, the comparison unit 1050 matches the initial position of the second travel path 20, 21, 22 (which might be an arbitrarily chosen absolute position) with the initial position of the first travel path 10. In order to quantitatively evaluate the mismatch between both paths, the comparing unit 1050 determines a deviation parameter (e.g., a sum or average) indicative of the distance between corresponding positions of the first and second travel path. Since this evaluation requires high computational resources, a sufficient number of positions is selected out from the data set on basis of which the comparison of both paths is carried out. For instance, in FIG. 3b for both paths three corresponding positions (positions 1, 3, and 6) are selected in order to evaluate the path mismatch between the first and second travel path 10, 20, 21, 22.

Based on the comparison results of the comparing unit 1050, the calibration unit 1040 calculates in a subsequent step S5 new candidates for the calibration parameters f, g, $V_{bias}$, on basis of which the pre-calibrated set of sensor data is calibrated. The calculation of the new candidates is performed using a particle filter. Alternatively, a minimizing algorithm which minimizes the value of the deviation parameter can be applied in order to calculate the calibration parameters f, g, $V_{bias}$.

The sensor data calibrated in such a way form a new second travel path 20, 21, 22, which is compared again with the corresponding first travel path 10 in the comparing unit 1050. The resulting new comparison results are fed to the calibration unit 1040 which—depending on the comparison result—calculates new candidates for the calibration parameters f, g, $V_{bias}$. Hence, the learning process comprises iteratively refining the calibration parameters f, g, $V_{bias}$ based on the foregoing comparison results of the first and second travel path 10, 20, 21, 22. The calibration and comparing steps are repeated many times until the second travel path 20, 21, 22 fits the first travel path 10 within a predetermined accuracy or a best fit result is achieved.

The advantage of the present technique for calibrating sensor data used for dead reckoning positioning systems is that dead reckoning sensor data (e.g., odometer and gyroscope data) can be calibrated simultaneously and, therefore, the time needed for the learning process is reduced. A further advantage is that the described technique is dynamic, since the determination of the calibration can be performed and updated at any time during a travel. The driving of a special manoeuvre, such as a turn between two driving straight manoeuvres is not required for calibration. In addition, the calibration performance can be quantitatively measured from the mismatch between the first and second travel path 10, 20, 21, 22.

Although embodiments of the proposed technique have been illustrated in the accompanying drawings and described in the description, it will be understood that the invention is not limited to the embodiments disclosed herein. In particular, the proposed technique is capable of numerous rearrangements, modifications and substitutions without departing from the scope of the invention as set forth and defined by the following claims.

The invention claimed is:

1. A method for calibrating sensor data used for dead reckoning positioning systems, the method comprising the steps of:
   simultaneously recording, by a storage unit, sensor data of at least one dead reckoning positioning sensor and position data of a position sensor during travel;
   comparing, by a comparing unit, a shape of a first travel path derived from the position data with a shape of a second travel path derived from the sensor data, wherein the shape of the first travel path is defined by absolute position data recorded consecutively during travel, and wherein the shape of the second travel path depends on the recorded sensor data and on calibration parameters for calibrating the sensor data; and
   calibrating, by a calibrating unit, the sensor data based on the shape comparison, wherein the calibrating step comprises iteratively refining the calibration parameters until the shape of the second travel path approximates the shape of the first travel path.

2. The method according to claim 1, wherein the comparing step comprises comparing the shape of the first travel path with the shape of the second travel path and determining a deviation parameter indicative of a shape deviation between the first and second travel path.

3. The method according to claim 2, wherein the deviation parameter is indicative of at least one of a distance between corresponding positions of the first and second travel path that are recorded at the same time and a heading deviation between the first and second travel path at their corresponding positions.

4. The method according to claim 2, wherein the calibrating step comprises calculating the calibration by minimizing the determined deviation parameter.

5. The method according to claim 1, wherein the calibrating step comprises calculating the calibration using a sequential Monte Carlo calculation.

6. The method according to claim 1, wherein for each path at least three corresponding positions are selected for the calibrating step.

7. The method according to claim 1, wherein the sensor data comprise at least one of odometer data and gyroscope data.

8. The method according to claim 7, wherein the odometer data is calibrated with a calibration value f, wherein the calibration value f is calculated from a ratio between a predetermined distance D and a number of pulses $N_D$ output by a dead reckoning positioning sensor in the form of an odometer while travelling the predetermined distance D.

9. The method according to claim 8, wherein the odometer data are pre-calibrated during travel by determining the predetermined distance from two consecutive positions detected by the position sensor.

10. The method according to claim 7 wherein the gyroscope data are calibrated with a scaling value and an offset value.

11. The method according to claim 10, wherein the offset value corresponds to a voltage signal output by a dead reckoning positioning sensor in the form of a gyroscope in the absence of a change of direction and is derived from a standing still event.

12. The method according to claim 10, wherein the scaling value is indicative of a ratio between an angular velocity and an output voltage corrected by the offset value, wherein for pre-calibration the scaling value is derived from a change of direction event.

13. The method according to claim 1, wherein calibration parameters of a previous calibration are used for pre-calibrating the sensor data.

14. A non-transitory computer readable recording medium storing a computer program product causing a computer device to execute the method according to any one of the preceding claims.

15. A device for calibrating sensor data used for dead reckoning positioning systems, comprising:
   a storage unit adapted to record simultaneously sensor data of at least one dead reckoning positioning sensor and position data of a position sensor during travel;
   a comparing unit adapted to compare a shape of a first travel path derived from the position data with a shape of a second travel path derived from the sensor data, wherein the shape of the first travel path is defined by absolute position data recorded consecutively during travel, and wherein the shape of the second travel path depends on the recorded sensor data and on calibration parameters for calibrating the sensor data; and
   a calibration unit adapted to calibrate the sensor data on basis of the shape comparison by iteratively refining the calibration parameters until the shape of the second travel path approximates the shape of the first travel path.

16. The device according to claim 15, further comprising the at least one dead reckoning positioning sensor in the form of at least one of:
   an odometer adapted to determine a covered distance d; and
   a gyroscope adapted to determine a change of direction 4.

17. The device according to claim 16, wherein the odometer outputs signal pulses and wherein the covered distance is determined by multiplying the number of output pulses with a calibration value.

18. The device according to claim 17, wherein for pre-calibration the calibration value is determined during travel by calculating a ratio between a predetermined distance D and the corresponding number of output pulses.

19. The device according to claim 17, wherein for pre-calibration the calibration value is determined during travel from the number of output pulses per time unit and a current velocity determined by the position sensor.

20. The device according to claim 16, wherein the gyroscope outputs a voltage signal that is calibrated with a scaling value and an offset value.

21. The device according to claim 20, wherein the calibrated voltage signal is multiplied with a predetermined time interval for determining the change of direction.

22. The device according to claim 20, wherein the scaling value is indicative of a ratio between an angular velocity of a change of direction and the output voltage corrected by the offset value and wherein for pre-calibration the scaling value is derived from a change of direction event.

23. The device according to claim 20, wherein the offset value corresponds to the voltage signal output by the gyroscope in the absence of a change of direction and it is derivable from a standing still event.

24. A navigation device, comprising the device of claim 15 and the position sensor.

* * * * *